July 7, 1925.

A. C. TEVES 1,545,363

STEERING GEAR CONNECTION

Filed April 1, 1924

WITNESSES

INVENTOR
A. C. Teves.
BY
ATTORNEYS

Patented July 7, 1925.

1,545,363

UNITED STATES PATENT OFFICE.

ALFRED C. TEVES, OF RICHMOND HILL, NEW YORK.

STEERING-GEAR CONNECTION.

Application filed April 1, 1924. Serial No. 703,567.

*To all whom it may concern:*

Be it known that I, ALFRED C. TEVES, a citizen of the United States, and a resident of the city of New York, Richmond Hill, Long Island, in the borough of Queens, county of Queens, and State of New York, have invented a new and Improved Steering-Gear Connection, of which the following is a full, clear, and exact description.

This invention relates to improvements in steering apparatus for motor vehicles, and has particular reference to a steering rod connection.

It is common knowledge, in certain types of motor vehicles, notably the Ford car and others, in which a reversible gear connection is utilized in the steering apparatus, that when the steering connections, and particularly the one between the steering post arm and the steering gear connecting rod become slightly worn, thus permitting the wheels to be easily turned by the steering wheel, driving of the car in many instances is rendered difficult and dangerous owing to a lateral vibratory movement of the front wheels of the vehicle, which movement is commonly known as "shimmying." This movement is caused by a combination of wear in the steering gear connections, a lack of binding in steering gear connections producing a twisting moment in the steering post, resiliency in the connecting rods, and also by the natural tendency of the driver of the vehicle in trying to overcome this movement which is transmitted to the steering wheel.

With the end in view of overcoming the above difficulty the present invention provides a connection for the steering mechanism of a vehicle which may be applied in position without altering standard parts and which effectively eliminates the twisting and reverse twisting of the steering post by introducing a frictional or binding action which acts as a drag upon the twisting or reverse twisting of the steering post eliminating the above vibratory lateral motion of the front wheels and steering wheel known as "shimmying".

The above and other objects will appear more clearly from the following detailed description, when taken in connection with the accompanying drawing, which illustrates a preferred embodiment of the inventive idea.

In the drawing—

Figure 1:
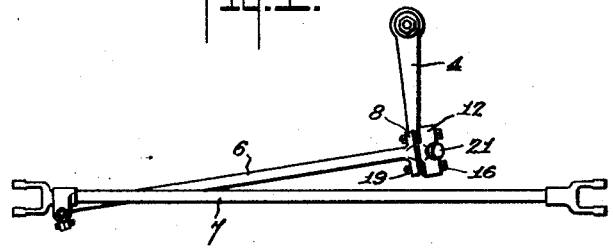
Figure 1 is an elevational view of a portion of the steering mechanism of the motor vehicle illustrating the present invention in connection therewith.
Figure 2:
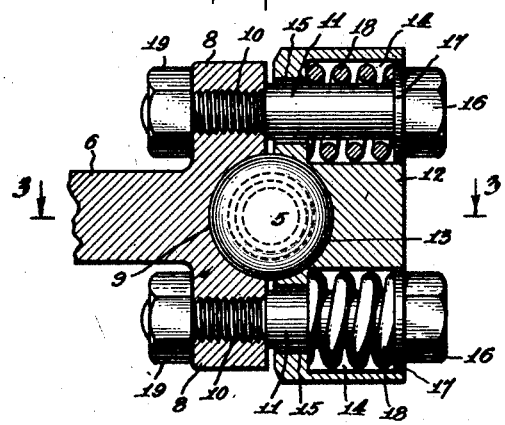
Figure 2 is an enlarged sectional view through the connection embodying the present invention.
Figure 3:
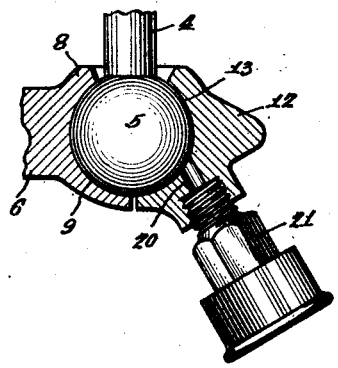
Figure 3 is a view substantially on the line 3—3 of Figure 2.

The invention is illustrated in connection with a portion of the steering mechanism of the Ford car, but it will be understood, of course, that the device embodying the present improvement may be utilized in connection with other mechanisms of a similar nature without departing from the spirit or scope of the invention. The portion of the steering mechanism shown consists of the crank arm 4 having the usual ball member 5 at one end to which is connected the steering gear connecting rod 6 which is associated with the steering spindle connecting rod 7 in the usual manner. The standard construction in Ford cars for joining the crank arm with the steering gear connecting rod consists of two cooperating members forming a socket for receiving the ball member 5.

The present invention is designed so that one of the above mentioned cooperating members may be employed, although it is to be expressly understood that the principle carried out in the present device may be employed in connection with other parts of the steering mechanism. The member preferably utilized is the one carried by the end of the rod 6 adjacent the crank arm and is designated in the drawing by the numeral 8, said member having a recess 9 therein forming a portion of the socket for receiving the ball member 5. On diametrically opposite sides of the recess 9 the member 8 is provided with screw threaded openings 10 for receiving the reduced screw threaded portions of bolts 11 which are utilized in connecting the member 8 with the cooperating member 12 forming a part of the present invention. This cooperating member is formed centrally thereof with a recess 13 similar to the recess 9 and combining therewith to form the socket for receiving the ball member 5. On diametrically opposite sides of the recess 13 the member 12 is provided with enlarged chambers 14 each of which opens into the face of the member 12 remote from that containing the recess 13. At the inner end of each chamber 14 the same communicates with a reduced opening 15 which, when the member 12 is in position, aligns with one of the screw threaded openings 10 in the member 8. When in this position the bolts 11 may be extended through the chambers 14 and openings 15 and the screw threaded portions of the bolts engaged in the openings 10 in the member 8. The bolts are turned until the shoulders contiguous to the inner end of the screw threads thereon are engaged tightly against the adjacent face of the member 8. At the headed end 16 of each bolt the same is provided with a flange 17 of a diameter substantially equal to that of the associated chamber 14 so as to form a closure for the open end of said chamber and also provide an abutment for one end of a heavy coil spring 18 the other end of which is seated against the portion of the member 12 forming the inner end of the chamber. In actual practice the two springs are compressed and cause a pressure of approximately six hundred pounds to be exerted on the steering arm ball member. After the bolts have been placed in position, as above described, a nut 19 is threaded on the end of each of the bolts extending through the member 8. Thus by the use of these heavy coil springs 18 it will be apparent that the members 8 and 12 are caused to frictionally bind against the ball member 5 to such an extent that should the steering post have any tendency to twist in either direction due to lateral vibrations of the front wheels of the vehicle, this tendency will be absorbed by the action of said springs. At the same time, it has been found in practice that the frictional binding on the ball member 5 of the steering mechanism will not affect the operation of steering the vehicle by movements of the steering wheel.

In order to provide for lubricating the connection the member 12 is formed with a passage 20 and has connected thereto a grease cup 21 of any desired construction for feeding a lubricant into said passage.

What is claimed is:

1. A device of the character described, comprising a ball and socket, the socket comprising two members having ball receiving recesses therein, coupling bolts connecting the members, one of said members having chambers therein receiving the bolts, devices on the bolts constituting closures for the chambers, and springs in the chambers interposed between the said devices and the inner ends of the chambers.

2. A device of the character described, comprising a ball and socket, the socket comprising two members having ball receiving recesses therein, coupling bolts projecting through one member and secured in the other member, one of said members having chambers therein receiving the bolts, heads on the bolts constituting closures for the chambers, and springs in the chambers around the bolts and interposed between the inner ends of the chambers and the bolt heads.

3. In a steering gear connection, the combination with a crank arm and connecting rod; of cooperating connecting members, one of which is carried by one of the first-named elements and both of which are provided with recesses forming a socket to receive a portion of said crank arm, the other cooperating member having chambers and communicating openings extending therethrough and disposed on opposite sides of said portion of the crank arm, members extending through said chambers and openings and also through the first-named cooperating member and having enlargements at one end forming abutments movable in said chambers, and resilient means interposed between said abutments and the inner ends of said chambers for creating a binding action between the crank arm and said cooperating members.

ALFRED C. TEVES.